G. W. BROWN.
Corn-Planter.
No. 9,893. Patented Aug. 2, 1853.
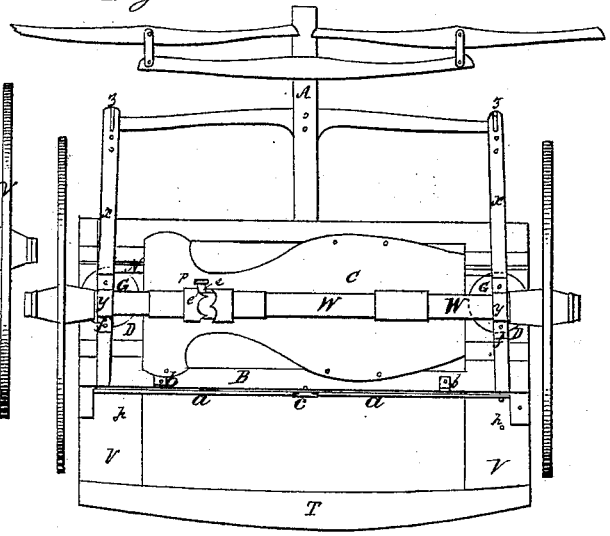
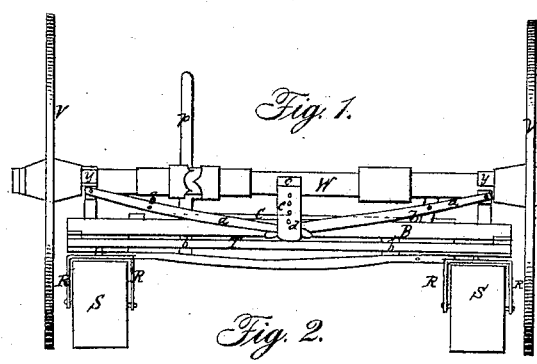
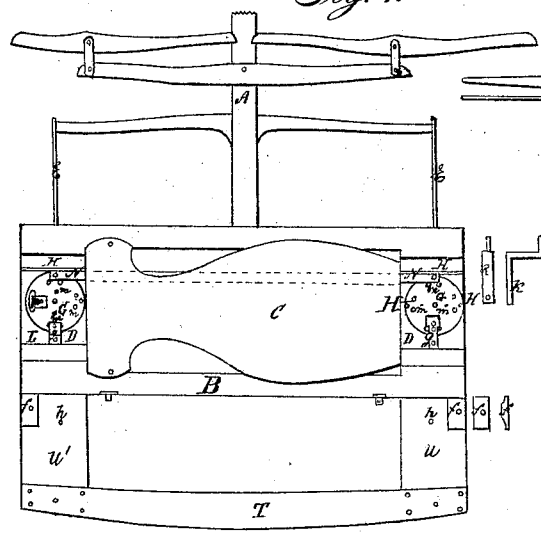
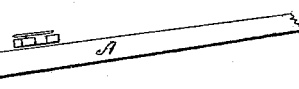
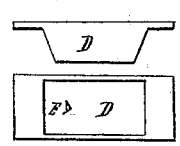
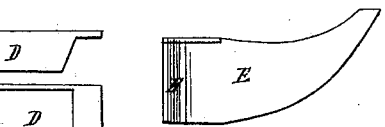
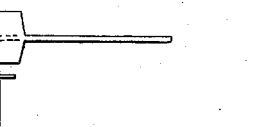
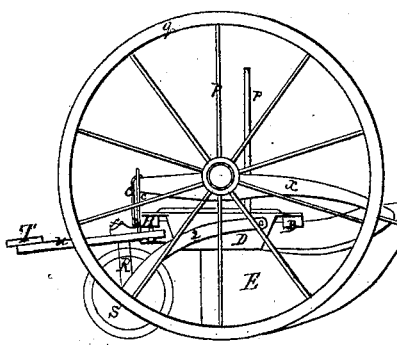
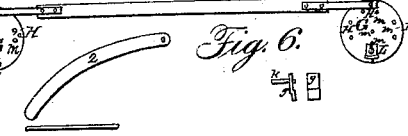
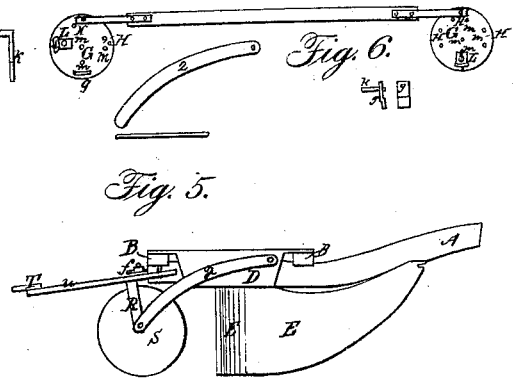

UNITED STATES PATENT OFFICE.

GEO. W. BROWN, OF TYLERVILLE, ILLINOIS.

IMPROVEMENT IN SEED-PLANTERS.

Specification forming part of Letters Patent No. 9,893, dated August 2, 1853; antedated February 2, 1853.

*To all whom it may concern:*

Be it known that I, GEORGE W. BROWN, of Tylerville, in the county of Warren and State of Illnois, have invented new and useful Improvements in Seed-Planters for planting corn and smaller grains, and have incorporated said improvements into a machine called the "Illinois Seed-Planter;" and I do hereby declare that the following is a full, clear, and exact description of the construction and operation of the same, reference being had to accompanying drawings, making a part of this specification, in which—

Figure 1 is a view in elevation, from the rear, of the machine when fitted for drilling grain; Fig. 2, a side view in elevation when fitted for drilling; Fig. 3, a top or bird's-eye view when fitted for drilling seed; Fig. 4, a top or bird's-eye view when fitted for planting in checked rows, having the wheels removed; Fig. 5, a side view when fitted for planting in checked rows.

Similar letters of reference indicate like parts in each of the several drawings.

To enable others skilled in the art to make and use my invention, I will proceed to describe its construction and operation.

A is the tongue of the machine; B, cross-bar, which is bolted to the rear end of the tongue and supports the hopper and seat-board; C, seat-board on which the person rides while planting in checked rows; D, hopper to hold the seed which is to be planted.

E are cutters, which are in the shape of sled-runners, so as not to clog, and are sharp, so as to cut the weeds and straw. It has also a double flange in the rear, of dovetail form, so as to part the earth smoothly, and it is capped at the rear, so as to form a tube nearly to the heel of the cutter. Through this tube the seed passes to the earth.

F is the tube just described.

G are the horizontal wheels in the bottom of the hopper. It has a variety of sized holes, H, to suit different kinds and sizes of grains, so as to graduate the quantity to be planted as desired. These holes being in pairs, the oscillating motion of the wheels passes one of these holes under a stationary cap, dropping its portion of seed into the tube F, while the mate hole, being out from under the cap, receives a portion of seed, and the cap graduates the amount of seed it carries to the tube, in its turn, by the oscillating motion of the wheel G.

I, Fig. 6, is the stationary cap under which the holes are to operate, as just described.

J, Fig. 5, is the slot for drilling small grain. Its operation is like the pairs of holes H and cap I, Fig. 6; but when drilling grain is to be done the pin K, Fig. 6, is screwed into cap I, so that its point will extend through cap I into the slot, and so prevent the seed from clogging in the slot; but in planting checked rows this screw only extends down to wheel G.

L is the slide, which is screwed into the edge of slot J, and it is to be moved back or forth, so as to cover as much of the slot as will admit just the quantity of seed required to be drilled.

M are stationary pins, four to each wheel, extending up from wheel G for the purpose of distributing the seed and moving it toward the holes and slots.

N, Fig. 5, is the connecting-rod, which has pins fitted into holes O in each wheel to give them their oscillating motion.

P is the lever, which is hung on a pin to the seat-board C, and by another pin to the connecting-rod N. This lever is moved to and fro, in planting checked rows, by the person who rides on the seat-board C. Each motion deposits two hills of seed. Previous to planting in checked rows the ground must be marked off one way, thus to enable the operator to deposit the hills so that the rows will cross each other at right angles.

Q are four short levers, hung by a hinge to each side of the seed-box, and the rear end united by the pieces R R, which are double vibrating braces extending down on each side of the planting-wheels S S, and the axles of those wheels S S pass through the lower ends of braces R R and Q Q.

U U are two flat levers, hung by hinges to cross-bar B, and the rear ends of these levers are bolted to cross-bar T. Then the braces or pieces R R rest under these flat levers on bolts at *h h*, so that by pressing downward the cross-bar T the levers U U will raise the cutters clear from the ground, the braces and wheels just described being the fulcrums. The weight of cross-bar T, together with the vibrating motion of planting-wheels S S, will press the earth on to the seed as nearly equal on uneven ground as on smooth. Directly in the rear of the hinge, on levers U U, is a button, *f*, which, when one end is turned between the lever and cross-bar B, will raise the cutters to one depth of cut, and when the other end is in the same place it will raise the cutter to another depth, and when neither end of the button is between the levers and the cross-bar B the cutters will run another depth, thus enabling me to plant three different depths.

V V are wheels on which the planter is mounted for drilling grain; W, axle which turns with wheels V V; X X, two bars, through which the axles of the wheels pass at Y Y to sustain the planter; Z Z, slots in the front end of the bars X X, which lock onto the front end of the cutters E by elevating the bars X X. When X X are depressed, the locks at Z Z being complete, the lever-bars *a* are attached to the rear ends of X X and swing on a pin in fulcrum-post *b*. The longer ends of the lever-bars *a* interlock at post *c*, which fits both sides of the ends of lever-bars *a*, leaving them free to move perpendicularly, so that when the ends of lever-bars *a* are elevated the levers raise the planter from the earth, or if partially elevated they will cause the planter to drill grain more shallow; and pin *d*, Fig. 1, is moved to holes *c* in order to sustain the planter in the position desired. Lever *p* has a friction roller or pin, *e*, on its side, which plays in a zigzag groove on the axle W for the purpose of oscillating the wheels G when drilling grain.

What I claim as my invention is—

1. The oscillating horizontal wheels or distributers in the bottom of the hoppers, having slots and holes of various sizes, in combination with the stationary caps and pins for the discharge of different kinds and quantities of seeds, as set forth.

2. The arrangement of the covering-rollers, mounted as described, and performing the purpose of covering the seed, elevating the cutters in turning around, and also in adjusting them to different depths, as set forth.

GEORGE W. BROWN.

Witnesses:
GEO. R. WEST,
A. B. STOUGHTON.